Feb. 14, 1961   G. A. PHELAN   2,972,098
VOLTAGE REGULATING SYSTEM
Filed July 25, 1956
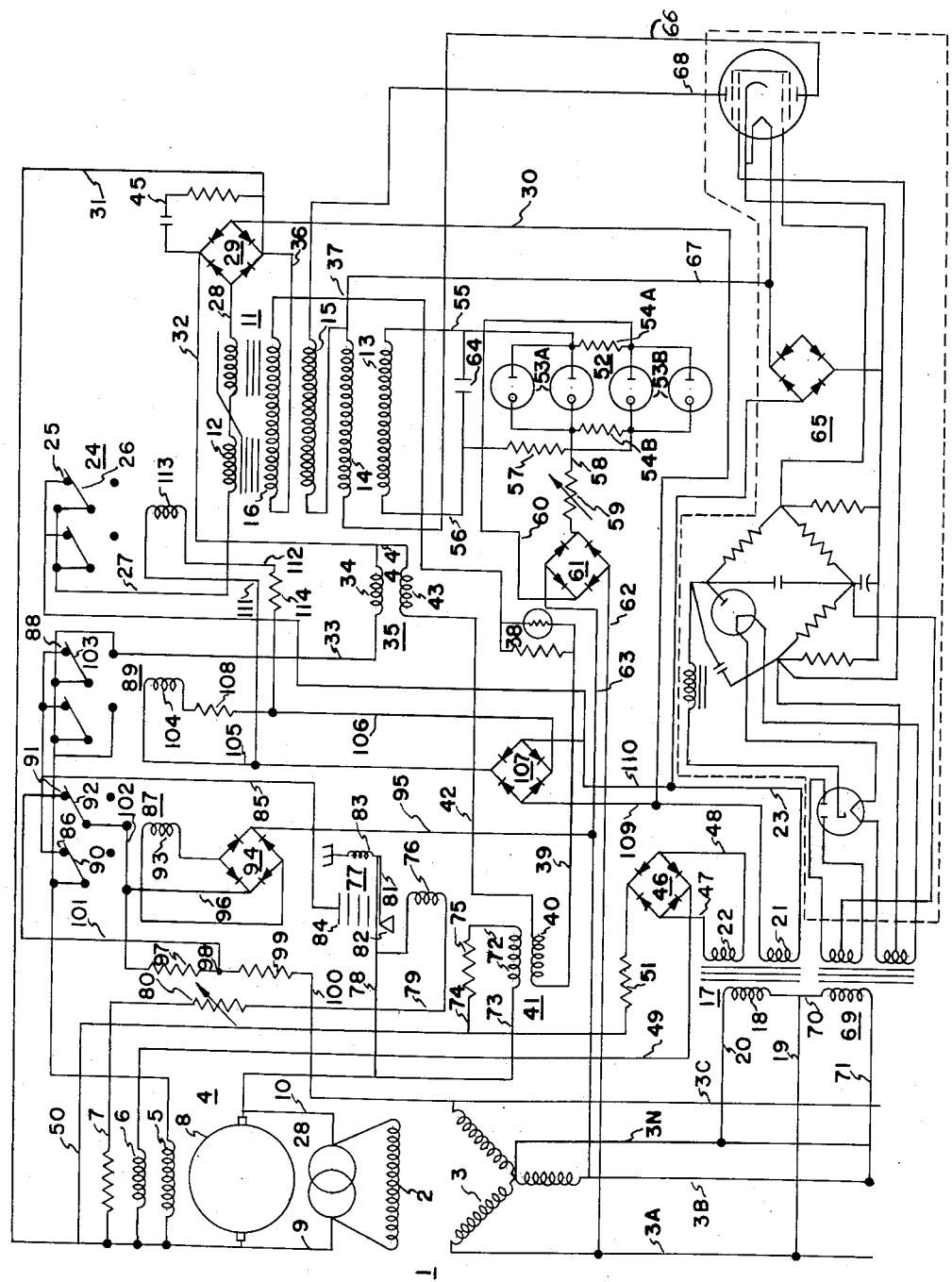
INVENTOR.
GEORGE A. PHELAN
BY
James M. Mickels
ATTORNEY

United States Patent Office 2,972,098
Patented Feb. 14, 1961

2,972,098

VOLTAGE REGULATING SYSTEM

George A. Phelan, East Orange, N.J., assignor to The Bendix Corporation, a corporation of Delaware Filed July 25, 1956, Ser. No. 600,141

4 Claims. (Cl. 322—24)

The present invention relates to generator systems and more particularly to means for maintaining close control of the regulated voltage of a variable frequency A.C. generator.

In the past, various arrangements for maintaining a constant output voltage for an A.C. generator have been utilized. Quite a few of these have incorporated moving parts and required considerable time for warm-up in order to have a stabilized output.

The present invention provides a regulating system utilizing a magnetic amplifier which has no moving parts and requires no warm-up period for satisfactory operation. Further, it provides close regulation over a wide range of generator speeds.

It is an object of the invention to provide an improved voltage regulating system.

Another object of the invention is to provide an improved regulating system for a generator wherein no moving parts are used.

Another object of the invention is to provide an improved magnetic amplifier regulating system.

Another object of the invention is to provide a novel regulating system that requires no warm-up period.

The above and other objects and features of the invention will appear more fully hereinafter from a consideration of the following description taken in connection with the accompanying drawing, wherein one embodiment is illustrated by way of example.

In the drawing:

The single figure is a schematic diagram of a regulating system embodying the invention.

Referring now to the drawing, an A.C. generator is indicated generally by the numeral 1 and includes a rotor winding 2 and a three phase stator winding 3. While a three phase winding has been illustrated, it is understood that it is not limited thereto. Output conductors 3A, 3B, 3C and 3N are connected to the stator windings 3. An exciter 4 is provided to energize the winding 2. The exciter 4 and winding 2 may be driven from any suitable source (not illustrated). The exciter 4 has a shunt field 5, bucking field 6 and ballast resistor 7, and armature winding 8. The output of the winding 8 is connected by conductors 9 and 10 through conventional slip rings to the winding 2.

The energization of the winding 5 is controlled by a magnetic amplifier 11 of the series reactor type. The amplifier 11 has an alternating current winding 12, a main control winding 13, trimmer windings 14 and 15, and feedback winding 16. The amplifier 11 may be of the toroidal type.

A transformer 17 has a primary winding 18 connected by conductors 19 and 20 across output conductors 3A and 3N. The transformer 17 has secondary windings 21 and 22. One side of the winding 21 is connected by conductor to contacts 25 of a relay 24 through switch arm 26 and conductor 27 to one side of the winding 12 of the reactor 11. The other side of the winding 12 is connected by conductor 28 to one input terminal of a rectifier 29. The other input terminal of the rectifier 29 is connected by conductor 30 to the other side of the winding 21 of the transformer 17.

One output terminal of the rectifier 29 is connected by a conductor 31 to the side of the winding 5 which is connected to one side of the winding 6 and ballast resistor 7. The other output terminal of the rectifier 29 is connected by conductors 32 and 33 in series with a winding 34 of a transformer 35 to the other side of the winding 5. One end of feedback winding 16 is connected by conductor 36 to the same output terminal of rectifier 29 as the conductor 31. The other end of the winding 16 is connected by conductor 37, temperature compensating network 38, conductor 39, winding 40 of a transformer 41, conductor 42, winding 43 of the transformer 35, conductor 44 and conductor 32 to the other output terminal of the rectifier 29. A stabilizing network 45 may be connected across the output of the rectifier 29.

A rectifier 46 is connected by conductors 47 and 48 across the winding 22 of the transformer 17. One output terminal of the rectifier 46 is connected by conductor 49 to one side of the bucking winding 6. The other output terminal of the rectifier is connected by conductor 50 to the other side of the winding 6. A resistor 51 may be provided in the conductor 50 to limit the current in the winding 6.

The main control winding 13 of the magnetic amplifier 11 is energized by a bridge circuit 52 which has voltage regulator tubes 53A and resistor 54A in one leg and tubes 53B and resistor 54B in the other leg. The bridge 52 has one output terminal connected by conductor 55 to one side of the winding 13 and the other output terminal connected by conductor 56 to the other side of the winding 13. A resistor 57 may be inserted in the conductor 56. The input terminals of the bridge 52 are connected by conductor 58, resistor 59 and conductor 60 across the output of a rectifier 61. The rectifier 61 is energized from the output of the generator 1 by being connected by conductors 62 and 63 across output lines 3A and 3B. A capacitor 64 may be connected across the output of the bridge 52.

Trimmer windings 14 and 15 of the amplifier 11 are connected across the output of an electronic sensing circuit 65 by conductors 66, 67 and 68. The circuit 65 is described and claimed in Emerson U.S. Patent No. 2,611,121 and a detailed description thereof will be omitted here for the sake of brevity. The circuit 65 is energized from the output of the machine 1 by a transformer 69 connected by conductors 70 and 71 across the output lines 3A and 3B.

The transformer 41 has a winding 72 connected by conductors 73, 74 and resistor 75 across the armature winding 8 of the exciter 4. A control winding 76 of a carbon pile regulator 77 is connected by conductors 78, 79 and resistor 7 across the winding 8. A resistor 80 may be inserted in the conductor 79. The carbon pile regulator is illustrated diagrammatically as having an armature 81 pivoted at 82 and biased by a spring 83 in a direction to compress a stack of carbon disk 84 in opposition to the winding 76. One side of the stack 84 is connected to the conductor 78 and the other side is connected by conductor 85 to a contact 86 on relay 87 and also to a contact 88 on relay 89.

The relay 87 has a switch member 90 connected to the conductor 33 and when in the deenergized position is biased into engagement with the contact 86. Also on the relay 87 are contact 91 and associated switch member 92. A control winding 93 is connected across the output of a rectifier 94. One input terminal of the rectifier 94 is connected by a conductor 95 to the output line 3B. The other input terminal of the rectifier 94 is connected by conductor 96, resistor 97, conductor 98, resistor 99 and conductor 100 to the output line 3C. A shunt is provided for the resistor 97 by conductor 101 connected to the contact 91, switch arm 92 and conductor 102. The function and operation of the relay 87 is described and claimed in copending application Serial No. 600,132 filed July 25, 1956.

The relay 89 in addition to the contact 88 has a switch arm 103 and a control winding 104. The switch arm 103 in the unenergized position is biased to engage the contact 87. The winding 104 is connected by conductors 105 and 106 across the output of a rectifier 107. A resistor 108 may be inserted in the conductor 106. The input of the rectifier 107 is connected by conductors 109 and 110 across the winding 21 of the transformer 17. Also connected across the output of rectifier 107 by conductors 111 and 112 is a control winding 113 for the relay 24. A resistor 114 may be inserted in the conductor 112. The function and operation of the relay are described and claimed in copending application Serial No. 600,131 filed July 25, 1956.

In operation, the output voltage of the generator 1 is controlled by regulating the output of the exciter 4. Output voltage is sensed by the bridge circuit 52, the output of which energizes the control winding 13 of the magnetic amplifier 11 in a direction depending upon the direction of deviation of the output voltage from a predetermined value. In addition to the main control winding, a pair of trimmer windings are provided. They are energized from an electronic sensing circuit which senses R.M.S. values and provides a highly sensitive control for the amplifier 11.

A feedback winding 16 is connected in a combination shunt feedback and stabilizing circuit. The stabilizing circuit has two transformers, the primary winding of one is connected in series with the exciter shunt field and the primary of the other across the rotating field. The secondary windings are connected in series with the feedback winding across the output rectifier of the magnetic amplifier.

In order to limit the ampere turn range required on the shunt field winding of the exciter, a bucking field winding is provided. The bucking field winding is energized from a rectifier connected to the A.C. output of the generator.

The relay 24 is provided to prevent the magnetic amplifier from going to saturation upon the removal of a short circuit on the stator of the generator or from some other transient condition. A control winding responsive to generator voltage is adjusted to actuate the relay 24 to an open circuit position upon the output voltage reaching a predetermined value to open the A.C. input to the magnetic amplifier. The A.C. voltage collapses. The starting relay 89 is then in position to give full field to the exciter and the output voltage will build up in a normal manner and the system is back to normal operating conditions.

The relay 87 provides means for limiting short circuit currents to a safe value. Upon a short circuit occurring, the voltage will collapse and the relay 87 will go to the closed position, as shown in the drawing. This will insert a carbon pile element in the shunt field circuit. The control winding of the carbon pile is connected to sense the current in the rotating field. A ballast resistor is connected in series with the control winding to provide temperature compensation. Thus, independent of generator speed, the rotating field current is held constant and thereby keeps the short circuit current constant and within safe limits.

Although only one embodiment of the the invention has been illustrated and described, various changes in the form and relative arrangement of the parts, which will now appear to those skilled in the art, may be made without departing from the scope of the invention.

What is claimed is:

1. A voltage regulating system for an alternating current generator having a direct current exciter, said exciter having a shunt field winding, a bucking field winding and an armature winding, comprising a saturable device having an alternating current winding, a main control winding, trimmer windings and a feedback winding, circuit means for energizing said alternating current winding from the output of said generator, voltage sensing means responsive to the output voltage for energizing said main control winding, electronic means for energizing said trimmer windings in accordance with the R.M.S. value of said output voltage, said last two windings coacting to provide a cumulative control for said alternating current winding, means for energizing said shunt field winding from the output of said alternating current winding, means for energizing said bucking winding in accordance with said generator output voltage in a direction to oppose said shunt field winding, and a stabilizing circuit connected in series with said feedback winding across the output of said alternating current winding.

2. A static voltage regulator for an alternating current generator, comprising a magnetic amplifier energized from said generator output, a first sensing circuit for providing a control current for said magnetic amplifier in accordance with the average value of said generator output, a second sensing circuit for providing a control current for said magnetic amplifier in accordance with the R.M.S. value of said generator output, said control currents coacting to provide a cumulative control, circuit means connecting the output of said magnetic amplifier to excite said generator, and antihunting means connected across the output of said generator to effect said excitation in a direction to oppose transient changes.

3. The combination as set forth in claim 2 and including means energized from said generator output to oppose said excitation.

4. A voltage regulating system for an alternating current generator having a direct current exciter which has a shunt field winding and an armature winding, comprising a series saturable reactor, said reactor having an A.C. winding, a main control winding, trimmer winding, and a feedback winding, circuit means including a relay for connecting said A.C. winding for energization from the output of said alternating current generator, a sensing circuit responsive to the average value of said generator output connected to energize said main control winding according to said average value, a second sensing circuit responsive to the R.M.S. value of said generator output connected to energize said trimmer windings in a direction determined by the direction of deviation of said output from a predetermined value, said control winding and said trimmer windings coacting to control the output of said A.C. winding, means including a rectifier for connecting the output of said A.C. winding to energize said shunt field winding, and an antihunting circuit including said feedback winding connected in series with a pair of stabilizing transformers across the output of said rectifier, one of said transformers having a winding connected in series with said shunt field, and the other of said transformers having a winding connected across said armature winding.

References Cited in the file of this patent
UNITED STATES PATENTS

| 2,161,179 | Logan | June 6, 1939 |
| --- | --- | --- |
| 2,394,049 | Fisher | Feb. 5, 1946 |
| 2,571,827 | Bradley | Oct. 16, 1951 |
| 2,665,402 | Clark | Jan. 5, 1954 |
| 2,666,885 | Bradley et al. | Jan. 19, 1954 |
| 2,715,205 | Ringland | Aug. 9, 1955 |
| 2,738,457 | Gilchrist | Mar. 13, 1956 |
| 2,773,232 | Herbst et al. | Dec. 4, 1956 |
| 2,791,740 | McKenna et al. | May 7, 1957 |